United States Patent
Ferrara et al.

(10) Patent No.: US 11,897,188 B2
(45) Date of Patent: Feb. 13, 2024

(54) METHOD AND SYSTEM FOR 3D PRINTING ON FABRIC

(71) Applicant: Xerox Corporation, Norwalk, CT (US)

(72) Inventors: Joseph Michael Ferrara, Webster, NY (US); Christopher Douglas Atwood, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 622 days.

(21) Appl. No.: 16/776,650

(22) Filed: Jan. 30, 2020

(65) Prior Publication Data
US 2021/0237343 A1 Aug. 5, 2021

(51) Int. Cl.
| | |
|---|---|
| *B29C 64/118* | (2017.01) |
| *B29C 64/295* | (2017.01) |
| *B29C 64/245* | (2017.01) |
| *B33Y 10/00* | (2015.01) |
| *B33Y 30/00* | (2015.01) |
| *B33Y 70/00* | (2020.01) |
| *B29B 11/06* | (2006.01) |
| *B29K 101/12* | (2006.01) |

(52) U.S. Cl.
CPC ............ *B29C 64/118* (2017.08); *B29B 11/06* (2013.01); *B29C 64/245* (2017.08); *B29C 64/295* (2017.08); *B33Y 10/00* (2014.12); *B33Y 30/00* (2014.12); *B29K 2101/12* (2013.01); *B29K 2713/00* (2013.01); *B33Y 70/00* (2014.12)

(58) Field of Classification Search
CPC ... B29C 64/118; B29C 64/245; B29C 64/295; B29C 64/209; B29B 11/06; B33Y 10/00; B33Y 30/00; B33Y 70/00; B29K 2101/12; B29K 2713/00
See application file for complete search history.

(56) References Cited

U.S. PATENT DOCUMENTS

| | | |
|---|---|---|
| 1,384,940 A | 7/1921 | Denison |
| 2,644,423 A | 7/1953 | Bauer |
| 3,227,077 A | 1/1966 | Farrer et al. |
| 3,600,730 A | 8/1971 | Evans |

(Continued)

FOREIGN PATENT DOCUMENTS

| | | |
|---|---|---|
| GB | 2166766 | 5/1986 |
| JP | 2014224899 A | 12/2014 |

(Continued)

OTHER PUBLICATIONS

U.S. Appl. No. 16/506,162, filed Jul. 9, 2019, Method and Apparatus for Digital Dyeing of Thread.

(Continued)

*Primary Examiner* — Joseph S Del Sole
*Assistant Examiner* — Baileigh Kate Darnell
(74) *Attorney, Agent, or Firm* — Fox Rothschild LLP

(57) ABSTRACT

A method of printing on fabric includes: (a) loading a thermoplastic material into a nozzle of an extruder, such as an extruder of a three dimensional (3D) printer; (b) positioning a substrate that includes fabric in a print area proximate to the nozzle; (c) heating the thermoplastic material in the nozzle to a temperature that is equal to or greater than a melting point temperature of the fabric; and (d) extruding the heated thermoplastic material from the nozzle as a filament onto the fabric to yield a printed pattern on the fabric.

14 Claims, 4 Drawing Sheets

(56) References Cited

U.S. PATENT DOCUMENTS

| | | | |
|---|---|---|---|
| 3,762,867 | A | 10/1973 | Crawford |
| 4,308,716 | A | 1/1982 | Bauer |
| 4,465,005 | A | 8/1984 | Eguchi et al. |
| 5,226,973 | A | 7/1993 | Chapman et al. |
| 5,853,859 | A | 12/1998 | Levy et al. |
| 6,189,989 | B1 | 2/2001 | Hirabayashi et al. |
| 6,276,779 | B1 | 8/2001 | Smith |
| 6,298,800 | B1 * | 10/2001 | Gala ............ D05C 9/04 112/103 |
| 6,690,908 | B1 | 2/2004 | Gayoso |
| 7,302,308 | B2 | 11/2007 | Kato et al. |
| 7,378,130 | B2 | 5/2008 | Coronado et al. |
| 8,993,061 | B2 | 3/2015 | Jones et al. |
| 9,162,503 | B2 | 10/2015 | Monteiro et al. |
| 10,525,734 | B1 | 1/2020 | Jackson et al. |
| 2005/0195261 | A1 | 9/2005 | Stelter et al. |
| 2007/0095218 | A1 | 5/2007 | Strange |
| 2011/0254896 | A1 | 10/2011 | Ferrarotti et al. |
| 2013/0194338 | A1 | 8/2013 | Hawkins et al. |
| 2014/0020191 | A1 * | 1/2014 | Jones ............ A43B 23/026 427/256 |
| 2016/0176118 | A1 * | 6/2016 | Reese ............ B29C 64/118 425/89 |
| 2016/0271950 | A1 | 9/2016 | Imahashi et al. |
| 2017/0120523 | A1 * | 5/2017 | Grover ............ B29C 64/106 |
| 2018/0171520 | A1 | 6/2018 | Eklind et al. |
| 2019/0246741 | A1 * | 8/2019 | Busbee ............ A43B 23/0215 |
| 2019/0248089 | A1 * | 8/2019 | Busbee ............ A41C 5/00 |
| 2021/0027634 | A1 | 9/2021 | Murray et al. |

FOREIGN PATENT DOCUMENTS

| | | |
|---|---|---|
| WO | 2010076823 A1 | 7/2010 |
| WO | 2016004686 A1 | 12/2016 |
| WO | 2017200473 A1 | 11/2017 |
| WO | 20170203524 A1 | 11/2017 |

OTHER PUBLICATIONS

U.S. Appl. No. 16/296,377, filed Mar. 8, 2019, Printer Head for Strand Element Printing.

Lee T. et al., "Nozzle-Free Liquid Microjetting via Homogeneous Bubble Nucleation", Physical Review Applied 3, 044007 (2015).

Jang D. et al., "Influence of Fluid Physical Properties on Ink-Jet Printability", Langmuir 2009, 25, pp. 2629-2635.

He B. et al., "The roles of wettability and surface tension in droplet formation during inkjet printing", Scientific Reports 7(1), Feb. 2017.

Friend J. et al., "Microscale acoustofluidics: Microfluidics driven via acoustics and ultrasonics", Reviews of Modern Physics, vol. 83, Apr.-Jun. 2011.

Hadimioglu B. et al., "Acoustic Ink Printing", Ultrasonics Symposium, 1992, Proceedings, IEEE.

Ellson R. et al., "Transfer of Low Nanoliter Volumes between Microplates Using Focused Acoustics—Automation Considerations", JALA, Oct. 2003.

Roessler C.G. et al., "Acoustic Injectors for Drop-On-Demand Serial Femtosecond Crystallography", Structure 24, 631-640, Apr. 5, 2016.

* cited by examiner

METHOD AND SYSTEM FOR 3D PRINTING ON FABRIC

BACKGROUND

Embroidery is a commonly used technique to provide three-dimensional (3D) depth when applying logos, graphic material and other items onto garments, headgear, signs and other products that incorporate fabric materials. To add the depth to the printed material, an insert made of foam or other material is placed on the fabric and then stitched over. Multiple insert layers can be used to give the effect of different pile heights. A stabilizer (such as a backer sheet) may be added to the side of the fabric that is opposite the applied stitching to add support material to hold the stitching in place and reducing the risk of tearing the fabric, which may be weakened by the stitching if a stabilizer were not used.

However, embroidery can be an expensive and time-consuming process. Even a small logo on an item such as a hat can take up to 30 minutes to apply. Also, the bobbins that are used to apply embroidery are prone to breaking. To address this, others have proposed creating 3D graphic material in the form of a sewn or pre-printed patch that is ironed, sewn or glued to the fabric. However, these solutions also typically require a stabilizer, and they require adhesives that can lose their effectiveness when the fabric is washed, especially if the fabric will be washed multiple times (as with a garment).

This document describes an improved method and system for applying 3D graphic material to fabric that addresses some or all of the problems described above.

SUMMARY

In various embodiments, a method of printing on fabric includes: (a) loading a thermoplastic material into a nozzle of an extruder; (b) positioning a substrate that includes fabric proximate to the nozzle; (c) heating the thermoplastic material in the nozzle to a temperature that is equal to or greater than a melting point temperature of the fabric; and (d) extruding the heated thermoplastic material from the nozzle as a filament onto the fabric to yield a printed pattern on the fabric.

Optionally, prior to positioning the fabric proximate to the nozzle, a support structure may be used to apply tension to stretch the fabric. The support structure may include, for example, a concentric ring structure. If so, then when extruding the heated thermoplastic material onto the fabric, the support structure may hold the fabric in a stretched condition. To do this, the fabric may be placed around an inner ring of the concentric ring structure. An outer ring of the concentric ring structure may secure the fabric between the inner ring and the outer ring, Optionally, prior to extruding the heated thermoplastic material into the fabric, the fabric may be pre-heated to a temperature that is between 50% and 95% of the melting point of the fabric. Pre-heating may occur in any of several ways. For example, the fabric may be placed on a thermally conductive plate, and a heating element may heat the thermally conductive plate Optionally, prior to loading the thermoplastic material into the nozzle of the extruder, the material may be pre-heated in a heating chamber.

In various embodiments, if the melting point temperature of the fabric is about 200° C. to about 250° C., then heating the thermoplastic material comprises heating the thermoplastic material to a temperature of about 200° C. to about 260° C. Other temperature ranges are possible.

In various embodiments, the fabric material may include thermoplastic. The fabric material may include one or more of the following: acrylic, acetate, polyester, polyolefin, olefin, nylon 6, polyvinyl chloride, modacrylic, spandex or elastane, rayon or other materials. The thermoplastic material that is extruded onto the fabric may include, for example, thermoplastic polyurethane (TPU).

The extruder may be a component of a three dimensional (3D) printer. For example, a 3D printer may include an extruder that contains a thermoplastic material, wherein the extruder includes a nozzle. A print area under the nozzle may be positioned to receive a filament of the thermoplastic material when ejected from the extruder via the nozzle. The 3D printer may include a liquefier comprising a first heating element that is positioned to apply heat to the thermoplastic material prior to the thermoplastic material being ejected from the nozzle. The 3D printer also may include a second heating element that is positioned to apply heat to the fabric when the fabric is placed in the print area. A support structure, such as a concentric ring structure, may be positioned in the print area for holding a fabric in a stretched condition when the fabric is positioned in the print area. The print area may include a thermally conductive plate, and the second heating element is in contact with or integral with the thermally conductive plate. The first heating element may be configured to heat the thermoplastic material to a temperature that is equal to or greater than a melting point of a fabric placed in the print area.

DETAILED DESCRIPTION

As used in this document, the singular forms "a," "an," and "the" include plural references unless the context clearly dictates otherwise. Unless defined otherwise, all technical and scientific terms used herein have the same meanings as commonly understood by one of ordinary skill in the art. As used in this document, the term "comprising" (or "comprises") means "including (or includes), but not limited to." When used in this document, the term "exemplary" is intended to mean "by way of example" and is not intended to indicate that a particular exemplary item is preferred or required.

In this document, when terms such "first" and "second" are used to modify a noun, such use is simply intended to distinguish one item from another, and is not intended to require a sequential order unless specifically stated. The term "approximately," when used in connection with a numeric value, is intended to include values that are close to, but not exactly, the number. For example, in some embodiments, the term "approximately" may include values that are within +/−10 percent of the value. The term "substantially," when used in connection with a numeric value, means at least 90% of the value In this document, the term "connected," when referring to two physical structures, means that the two physical structures touch each other. Devices that are connected may be secured to each other, or they may simply touch each other and not be secured.

In this document, the term "thermally connected", when referring to two components, means that a conductive path exists between the two components. The path may be a direct path (such as by a conductor), or an indirect path through other elements and/or a relatively small air gap.

When used in this document, terms such as "top" and "bottom," "upper" and "lower", "above" and "below", or "front" and "rear," are not intended to have absolute orientations but are instead intended to describe relative positions of various components with respect to each other. For example, a first component may be "above" a second component when a device that includes the components is oriented in a first direction, but the first component may be "below" the second component if the device is turned upside-down. The relative orientations of the components may be reversed, or the components may be on the same plane, if the orientation of the structure that contains the components is changed. The claims are intended to include all orientations of a device containing such components.

Additional terms that are relevant to this disclosure will be defined at the end of this Detailed Description section.

Figure 1:
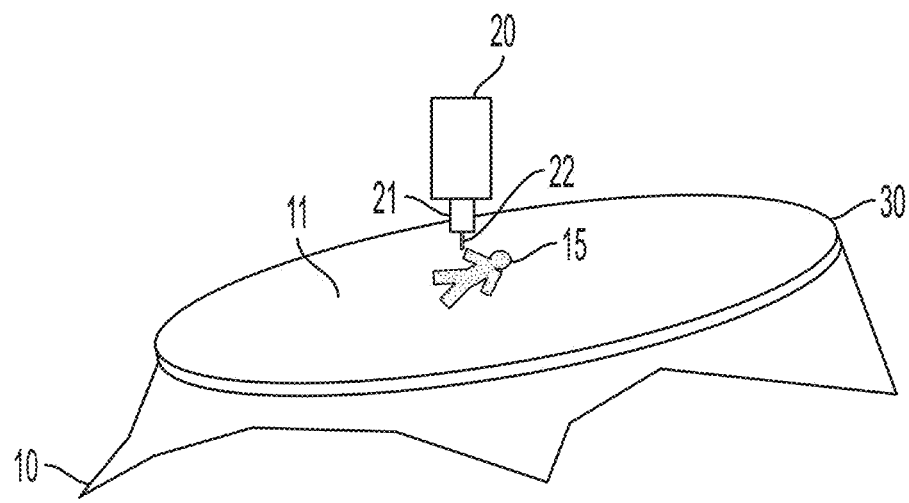
FIG. 1 illustrates certain elements of an example system and process for printing 3D content onto a fabric item.

FIG. 1 illustrates certain basic elements of a system and process for printing 3D content onto a garment or other item that includes fabric. As shown in FIG. 1, the fabric 10 includes a target printing area 11 onto which graphics, text or other content 15 are to be printed. The fabric will be positioned proximate to the outlet of an extruder 20. The extruder 20 may be a component of a three-dimensional (3D) printer that is configured for fused filament fabrication, as will be described in more detail below. The extruder 20 includes a nozzle 21 that provides an outlet via which a filament 22 of heated thermoplastic material is extruded so that the filament contacts and imprints upon the target printing area 11 of the fabric 10. The temperature of the heated thermoplastic material may be substantially equal to, or even greater than, the melting point temperature of the fabric's thermoplastic components.

The fabric 10 may be stretched and held by a support structure 30. As shown, the support structure 30 includes a concentric ring structure, such as those commonly known as embroidery hoops. The fabric 10 may be placed around an inner ring of the concentric ring structure 30, and an outer ring of the concentric ring structure 30 will then be placed over the fabric 10 to secure the fabric 10 between the inner ring and the outer ring while stretching (creating tension in) the target area 11.

The process described above is especially suitable for situations in which the fabric is made of a material that also melts, so that molten filament may interact and bond with molten components fabric material. For example, the fabric may contain a thermoplastic material, and/or it may include a synthetic fabric material such as acrylic, acetate, polyester, polyolefin, olefin, nylon 6, polyvinyl chloride, modacrylic, spandex or elastane, and/or rayon. If so, the fabric may be pre-heated on a plate so that it softens. When the molten filament contacts the softened fabric, the two materials will form a strong permanent bond with each other.

Figure 2:
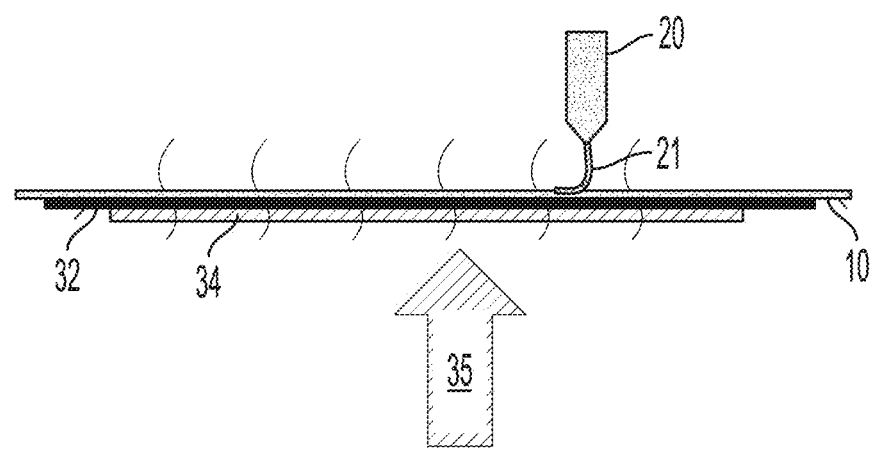
FIG. 2 illustrates additional elements that an example system may include.

FIG. 2 illustrates additional components of a system that may be used to heat the fabric and apply the filament 22 of thermoplastic material to the fabric 10 in such situations. The target printing area of the fabric is placed on a thermally conductive plate 32 such as a print platen that is heated by a heating element 35. The conductive plate 32 may be made of ceramic, porcelain-coated stainless steel, milled and/or coated aluminum, or another conductive material that can be heated and cooled relatively quickly. Heating can be provided through convection or radiation from a non-contact heating element 35, or through conduction from a heating element 34 that is in direct contact with or embedded inside of conductive plate 32. The heating element 35 or heating element 34 may be any suitable heating structure, such as a nickel chromium (nichrome) wire, coil or tube that is connected to a source of electric current; or a thick film heater. The conductive plate 32 and heating element 35 or heating element 34 will be large enough and connected to a current source that is sufficient to heat the fabric at least to a temperature that at least above ambient temperature, and that optionally is near, but is not at or over, the melting point of the fabric's thermoplastic components. For example, depending on the fabric uses, the temperature of the conductive plate 32 may be between 50% and 95% of the applicable melting point, or any subrange within those ranges, such as any range with a lower limit of (in each case approximately) 50%, 60%, 70%, 80%, or 90% and an upper limit of (in each case approximately) 55%, 65%, 75%, 85%, or 95%. Other ranges may be possible. For example, fabrics having a low melting point temperature may be heated very little. The temperature will be sufficient to at least partially melt at least some of the fibers in the fabric, but not so much as the fabric entirely melts and becomes visibly deformed.

Figure 3:
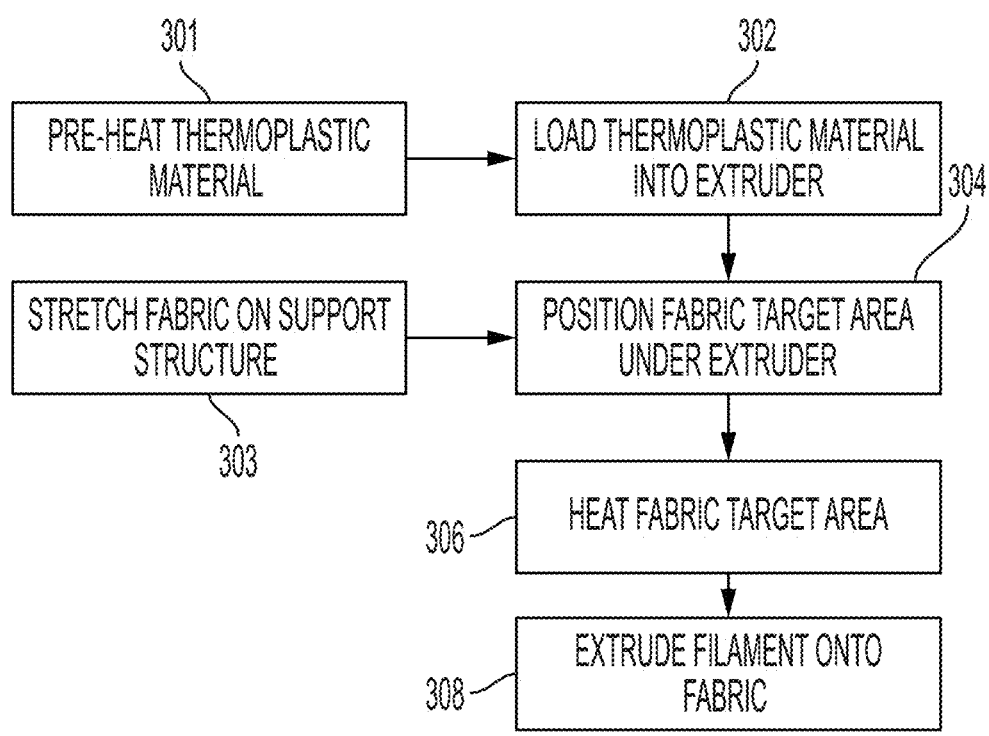
FIG. 3 illustrates various elements of a process for printing 3D content onto fabric.

FIG. 3 illustrates a process of printing 3D content onto fabric. At 302, thermoplastic material may be loaded into an extruder. As noted above, the extruder may be a component of a 3D printer, and it may have a nozzle via which a molten filament may be extruded. The thermoplastic material may be thermoplastic polyurethane (TPU), thermoplastic elastomers (TPE), acrylonitrile butadiene styrene (ABS), polylactic acid (PLA), high-impact polystyrene (HIPS), aliphatic polyamides (nylon), polyethelene (PE) or polycarbonate (PC). The thermoplastic material may be in the form of a block, chips, pellets, shavings, a larger filament or rod, or in another solid form. The system may heat the material in the extruder. In addition to heating in the extruder or as an alternative, at 301 the thermoplastic material may be pre-heated in a heating receptacle and transferred to the extruder in liquid form. The pre-heating and/or heating in the nozzle will raise the temperature of the thermoplastic filament material to a level that is at least 50% of the melting point temperature of the fabric. In some situations, the temperature of the thermoplastic material may be above the melting point temperature of the fabric when it leaves the extruder's nozzle.

At 304 a substrate that includes the target area of the fabric will be positioned near the extruder's nozzle, close enough so that molten filament from the nozzle will transfer to the fabric as described in the previous figures. The nozzle may be moved to different areas of the fabric to apply a pattern as defined by programming instructions and/or a design data file. As also noted above, at 303 the target area may be stretched by a support structure. Stretching the fabric before applying the molten thermoplastic may help the molten filament penetrate the pores of the fabric's target area, to infuse the fabric and provide a secure bond when the filament cools. In addition, at 306 the fabric's target area may be heated prior to and/or during extrusion using a heating plate or other heating structure.

When the filament material is at a desired temperature, at 308 the extruder may extrude the filament onto the fabric, depositing it in layers to provide a 3D structure. Optionally, multiple extruders may be employed to deposit filaments of different colors, or filaments of different types of material (such as a combination of hard plastic and flexible filament TPU/TPE). In such situations, multiple extruders that include materials of different colors and/or different types may acting together. Or, the system may operate in steps that include changing what filament is loaded partway through a job, or using a filament with more than one color as input to the extruder. With the process described above, no backing material is required to secure the printed content to the fabric. In addition, no curing process such as ultraviolet light curing processes that are required in prior art fabric printing processes.

By way of example, when TPU material is extruded onto a thermoplastic fabric that has a melting point of approximately 220-250° C., the thermoplastic material may be heated to a level of approximately 230-260° C. If the fabric has a melting point of approximately 200-240° C. then the extruded filament may be heated to approximately 200-250° C. and the fabric may be pre-heated to approximately 180-195° C.

Figure 4:
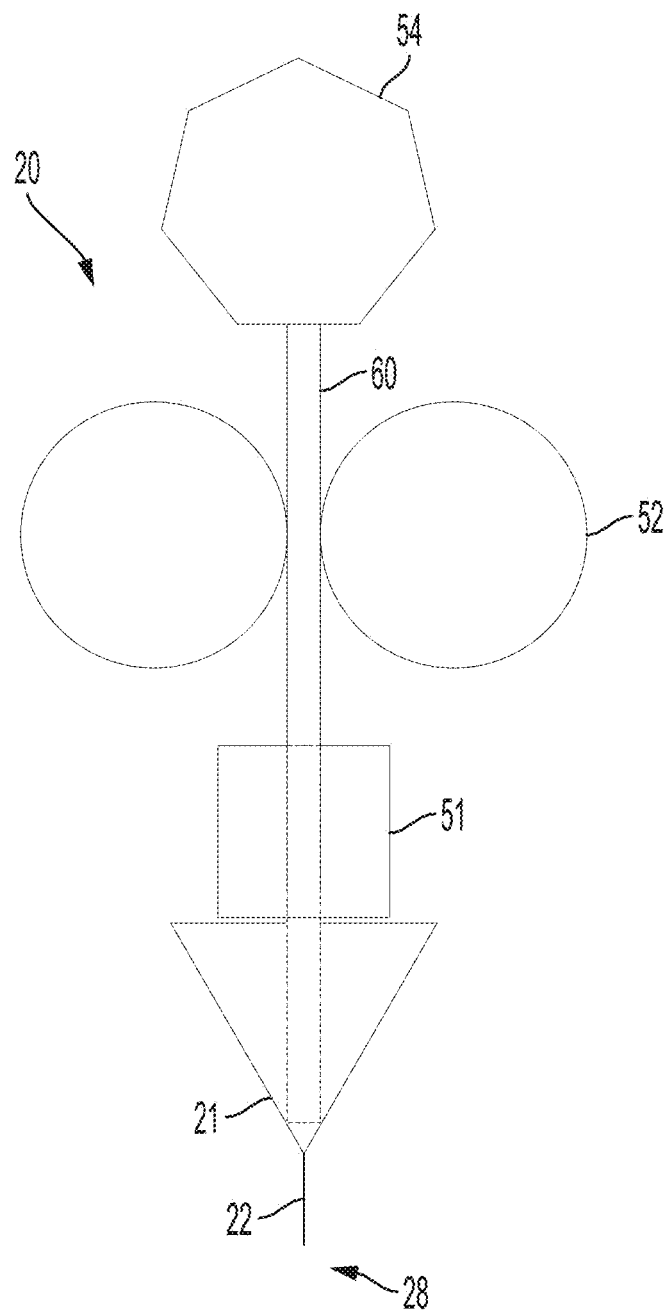
FIG. 4 illustrates example components of a 3D printer extruder system.

As noted above, the extruder may be a component of a 3D printer. FIG. 4 described various elements of a 3D printer that is configured for fused filament fabrication. The extruder 20 receives thermoplastic material 60, shown in rod form but optionally in other forms. The extruder 20 may include rollers 52 that apply pressure to, soften and/or direct the thermoplastic material 60 to a liquefier 51, such as a container with thermocouples for heating. Optionally, the thermoplastic material may be pre-heated in a heating chamber 54 before it enters the liquefier 51. The liquefied material exits the liquefier 61 and enters the nozzle 21, from which it is extruded as a filament 22. Optionally, the print area 28 under the nozzle 21 may be a chamber that contains an inert gas such as nitrogen or argon, to help increase layer adhesion.

The features and functions described above, as well as alternatives, may be combined into many other different systems or applications. Various alternatives, modifications, variations or improvements may be made by those skilled in the art, each of which is also intended to be encompassed by the disclosed embodiments.

The invention claimed is:

1. A method of printing on fabric, the method comprising:
   loading a thermoplastic material into a nozzle of an extruder;
   using a support structure to apply tension to stretch a fabric having fibers;
   positioning proximate to the nozzle a fabric having fibers while holding the fabric in a stretched condition;
   heating the thermoplastic material to a temperature that is equal to or greater than a melting point temperature of the fabric;
   heating the fabric to a temperature that is above ambient temperature and below the melting point temperature of the fabric; and
   while holding the fabric in a stretched condition with the support structure, extruding the heated thermoplastic material from the nozzle as a filament onto the fabric to at least partially melt at least some of the fibers in the fabric to provide a secure bond between the heated thermoplastic material and the fabric and yield a printed pattern on the fabric.

2. The method of claim 1, wherein:
   the support structure comprises a concentric ring structure; and
   using the support structure to apply tension to stretch the fabric comprises placing the fabric around an inner ring of the concentric ring structure and using an outer ring of the concentric ring structure to secure the fabric between the inner ring and the outer ring.

3. The method of claim 1, wherein heating the fabric to a temperature that is above ambient temperature and below the melting point temperature of the fabric comprises heating the fabric to a temperature that is between 50% and 95% of the melting point of the fabric.

4. The method of claim 1, wherein pre-heating the fabric comprises:
   placing the fabric on a thermally conductive plate; and
   heating the thermally conductive plate.

5. The method of claim 1, further comprising, prior to loading the thermoplastic material into the nozzle of the extruder, pre-heating the thermoplastic material in a heating chamber.

6. The method of claim 1, wherein the melting point temperature of the fabric is about 200° C. to about 250° C.

7. The method of claim 6, wherein heating the thermoplastic material comprises heating the thermoplastic material to a temperature of about 200° C. to about 260° C.

8. The method of claim 1, wherein the fabric comprises a thermoplastic material.

9. The method of claim 1, wherein the fabric material comprises one or more of the following: acrylic, acetate, polyester, polyolefin, olefin, nylon 6, polyvinyl chloride, modacrylic, spandex or elastane, or rayon.

10. The method of claim 1, wherein the thermoplastic material comprises thermoplastic polyurethane (TPU).

11. The method of claim 1, wherein the extruder is a component of a three dimensional (3D) printer.

12. A method of printing on fabric, the method comprising:
   loading a thermoplastic material into a nozzle of an extruder of a three dimensional (3D) printer;
   positioning on a support structure in a print area of the 3D printer a fabric having fibers, wherein the support structure holds the fabric in a stretched condition;
   heating the thermoplastic material to a temperature that is equal to or greater than a melting point temperature of the fabric;
   heating the fabric to a temperature that is above ambient temperature and below the melting point temperature of the fabric; and
   extruding the heated thermoplastic material from the nozzle as a filament onto the fabric in the print area to at least partially melt at least some of the fibers in the fabric to provide a secure bond between the heated thermoplastic material and the fabric and yield a printed pattern on the fabric.

13. The method of claim 12, wherein the fabric comprises a thermoplastic material.

14. The method of claim 12, wherein:
   the melting point temperature of the fabric is about 200° C. to about 250° C.; and
   heating the thermoplastic material comprises heating the thermoplastic material to a temperature of about 200° C. to about 260° C.

* * * * *